UNITED STATES PATENT OFFICE 2,265,819

HYDROCARBON COMPOSITION

Raphael Rosen, Elizabeth, N. J., assignor to Standard Oil Development Company, a corporation of Delaware No Drawing. Application December 2, 1939, Serial No. 307,263

4 Claims. (Cl. 252—44)

This invention relates to improved oil compositions which, during their service as lubricating oils in automotive engines, are exposed to high temperature conditions and which are characterized by increased stability under such conditions; more specifically, it relates to hydrocarbon base lubricating oil compositions containing metallo-organic stabilizing agents which decrease formation of hard varnish-like and sludge deposits when the oil compositions are used for lubricating hot metal surfaces of internal combustion engines. This invention will be fully understood from the following description.

The effects on lubricating and similar oils of various metallo-organic agents containing an element selected from the second, third, and fifth groups of the periodic table of elements are described in my copending application Serial No. 719,603 (filed April 7, 1934), of which the present application is a continuation-in-part. Said copending application, in its more specific aspects, is directed particularly to metallo-organic compounds containing an aromatic or hydrocarbon radical and in which the metallo constituent is one of the heavier elements of the second, third, and fifth groups.

The term "metallo-organic" refers to compounds in which a metallic or somewhat metallic element is directly joined to at least 1 carbon atom of an organic radical, e. g. an aliphatic, aromatic, or alicyclic radical. Among the novel hydrocarbon oil composition addition agents which I have indicated as possessing anti-sludge-forming and varnish-reducing properties are organic compounds of the lighter elements, which compounds have the principal characteristics of the metallo-organic agents. For example, the organo-boron compounds are described and specifically claimed as addition agents in my copending application Serial No. 166,621, now Patent No. 2,234,581 (patented Mar. 11, 1941), while organo-arsenic compounds are specifically described and claimed in my copending application Serial No. 719,603, now Patent No. 2,181,-913 (patented December 5, 1939).

The present invention is concerned with the improvement of oil compositions by the use of organo-phosphorus compounds as the addition agents. These compounds approach very closely to the organo-arsenic compounds in chemical properties (as pointed out in "Die Chemie der metallo-organischen Verbindungen," by E. Krause and A. V. Grosse) and their effects on the oil compositions, as shown in the present invention.

Organo-phosphorus compounds which are of interest as blending agents have compositions corresponding to those of organo-arsenic and other metallo-organic agents, which may be formulated as follows:

$$R_nMX_{v-n}$$

wherein R represents organic groups, M represents a metallo constituent joined to a carbon atom of each R group, and X represents a hydrogen atom or other univalent inorganic atom or group, which may or may not be present. The subscript $n$ denotes the number of R groups linked by one valence each to the metallo constituent, and the subscript $v-n$ denotes the number of X groups attached to the metallo constituent. Thus, when $v$ is equal to $n$, no X group is present. Of course, if the X group is polyvalent, the $R_nM$ groups are varied to satisfy the particular valence of the metallo constituent and the X group. In some instances the $R_nM$ groups are linked together as in $R_nM:MR_n$ or in heterocyclic compounds.

The efficacy of the compounds of this invention as lubricating oil addition agents depends on their composition and constitution. Among the organic groups (R) which may be present in said compounds connected to the phosphorus constituent are the simple alkyl radicals, such as methyl, ethyl, propyl, butyl, etc., and preferably the branched isomers of those having more than two carbon atoms. Addition agents containing such radicals are particularly satisfactory at high temperatures, namely 200° C.–250° C., and higher. The cyclic radicals, such as phenyl, naphthyl, and anthryl, are more important substituents, because addition agents containing these radicals are effective both at low temperatures, 100° C.–150° C., and high temperatures, 250° C. and higher. The alkylated aromatic radicals, such as tolyl, alpha- and beta-normal or isopropyl-naphthyl, primary or secondary hexyl-naphthyl or anthryl radicals, are especially desirable organic groups. The aryl-substituted aliphatic radicals, such as diphenyl methyl, are also satisfactory. In some cases, it is preferred to use the alkylated aromatic compounds instead of the unalkylated compounds so that the corresponding addition agents may be more soluble in lubricating oils, although it must be appreciated that the substances of this invention are ordinarily sufficiently soluble in hydrocarbon oil to be effective.

It should also be understood that the organic groups need not be completely hydrocarbon in character, although it is generally so preferred.

Inorganic functions which may be present in the addition agents as substituents in the organic radicals, or in groups attached directly to the phosphorus constituent may include nitrogen, sulfur, a halogen, or oxygen, as in chloride, amino, sulfide, thiocyanate, acyl, or hydroxyl groups.

Organo-phosphorus compounds of numerous types can be suitably used for the purposes of this invention. Those having only one phosphorus atom per molecule may contain 1 to 3 organic groups (R) and sufficient inorganic groups (X) to satisfy the valence of the phosphorus atom and the stability of the compound; the R groups may be aliphatic, aromatic, alicyclic, or heterocyclic radicals, and the X groups may be inorganic radicals, such as previously described.

From the foregoing description, it will be clear that compounds containing phosphorus in combination with radicals of many types are satisfactory for the present purposes. At this point, it is considered desirable to list specific types of compounds which have been found to be particularly valuable for the present purposes.

True organo-phosphorus compounds, which, by definition, contain carbon to phosphorus linkages, may be characterized as being substitution products of the hydrogen phosphides, $PH_3$ and $(PH_2)_2$, and addition compounds of these substitution products with compounds containing a negative group. Since organic radicals may be substituted for any or all of the hydrogen atoms attached to the phosphorus atom in each phosphine molecule, the organic phosphines may be primary, secondary, or tertiary compounds, and since the organic phosphines readily form additive compounds with molecules containing a negative group, such as a halogen, sulfur, nitrogen, or oxygen containing group, these additive compounds may also be used.

The organic derivatives of phosphine, $PH_3$, may be represented by the general formula:

$$P\begin{matrix}-R_1\\-R_2\\-R_3\end{matrix}$$

wherein $R^1$, $R^2$, and $R^3$ represent functions selected from the group consisting of hydrogen atoms or organic radicals, at least one of said functions being an organic group. The following are representative examples of this type of organo-phosphorus compounds:

Triethyl phosphine, $(C_2H_5)_3P$
Tri-n-propyl phosphine, $(n-C_3H_7)_3P$
Tri-isobutyl phosphine, $(i-C_4H_9)_3P$
Tri-isoamyl phosphine, $(i-C_5H_{11})_3P$
Phenyl phosphine, $C_6H_5.PH_2$
Diphenyl phosphine, $(C_6H_5)_2PH$
Triphenyl phosphine, $(C_6H_5)_3P$
Phenyl dipropyl phosphine, $(C_6H_5)(C_3H_7)_2P$
Phenyl di-isobutyl phosphine, $(C_6H_5)(i-C_4H_9)_2P$
Tolyl di-isobutyl phosphine,
$(C_6H_5.CH_3)(i-C_4H_9)_2P$
Dibenzyl isoamyl phosphine,
$(C_6H_5.CH_2)_2(i-C_5H_{11})P$
Tri-para-biphenyl phosphine, $(C_6H_5.C_6H_4)_3P$ A common method for forming the described organic phosphines involves the reaction of a phosphorus halide, usually phosphorus tri-iodide, with a Grignard compound. Some of the aryl phosphines are considered to be most readily prepared from phosphonium halides, as described in Jour. Chem. Soc. (London), page 1262 (1929).

In addition to the organic phosphine compounds which have been described, closely related phosphonium compounds and diphosphines are also considered to be of value for the present purposes. The tertiary phosphines readily react with alkyl halides and other compounds containing a negative function to form phosphonium salts. These salts may be represented by the formula:

$$R_3P.RX$$

wherein X represents a negative function, such as the halogen atom in an alkyl halide.

The diphosphines are compounds having the general formula:

$$R_2P.PR_2$$

A specific example of this type of compound is tetra-phenyl diphosphine, $(C_6H_5)_2P.P(C_6H_5)_2$, which is formed by condensing diphenyl chlor phosphine with diphenyl phosphine.

While the exact nature of these various compounds and the mechanisms by which they improve a lubricating oil are not particularly well understood, it has been observed that they possess, to greater or less degree, the property of decreasing the sludging tendency of an oil, which means that any decomposition products formed in their presence, regardless of the nature of said decomposition products, are rendered freely soluble or at least dispersible in the oil and that the tendency for deposition of hard varnish- or lacquer-like coatings on hot metal surfaces in contact with the oil is greatly diminished.

No explanation of this behavior is presented, but it has been observed that the addition of the organo-phosphorus compounds to lubricating oils resulted in decreased sludge-forming and varnish-forming tendencies of those oils from which, in service, a substantial quantity of such undesirable deposits is ordinarily produced. It is not desired to infer that these deposits are the result of oxidation alone, as has been believed at times, and it is specifically desired not to limit the present invention to any theory of the chemical action involved.

The amounts of the addition agents which are used, are, in all instances, minute, in general, less than substantially 5% of the composition, as much as 0.01% to 0.02% producing noticeable effects. It is generally desirable, however, to use from 0.2% to 0.5%, and it is rare that more than 1% is required. The substances mentioned are effective in many different types of petroleum products having boiling ranges above that of kerosene, whether derived from paraffin, naphthene asphalt, or various mixed base crudes, and whether refined by acid or clay treatment, solvent extraction, hydrogenation, destructive hydrogenation, or otherwise, including the white oils refined to a high degree by treatment with concentrated sulfuric acid.

As previously noted, one of the principal properties of the addition agents mentioned is their efficacy in reducing sludge- and varnish-formation, but it is to be realized that in no case is this tendency absolutely eliminated, and in many instances it is desirable to add sludge-dispersing agents of other types to the oil compositions.

In order to determine the relative merits of organo-phosphorus compounds and other compounds of the metallo-organic type, the following tests were conducted:

Sligh tests were carried out according to the

A. S. T. M. procedure (Proc. Am. Soc. for Testing Materials, 964-II, 1924), modified so that the oil composition was subjected to heat and oxidation for a period of 24 hours instead of only two hours.

The cone test, which correlates with conditions and results obtaining in internal combustion engines during their ordinary operations, determines the amount of naphtha-insoluble residue (in grams) formed in two hours from an oil composition allowed to flow at a rate of 30 cc. per hour around a groove in a metal cone of standardized dimensions while the cone is held at a temperature of 250° C. The cones may be constructed of the same metals that are used in the construction of pistons and cylinder walls of internal combustion engines.

Representative results from a series of experimental determinations on oil compositions containing organo-phosphorus addition agents are presented in the following examples:

*Example*

A sample of a refined lubricating oil, S. A. E. 50, was compared by the cone test with samples of the same oil to which were added, in one instance, .2% of triphenyl arsine, and in another instance, .2% of triphenyl phosphine. Results of these tests are tabulated as follows:

| | Cone test |
|---|---|
| Blank oil | 0.50 |
| Blank oil + .2% triphenyl arsine | 0.36 |
| Blank oil + .2% triphenyl phosphine | 0.38 |

From the above comparison, it can be seen that the organo-phosphines are substantially as influential in improving the cone test of a lubricating oil as are the corresponding organo-arsines.

In reducing sludge precipication at lower temperatures as indicated by the Slight test, the organo-phosphorus compounds also exhibited a favorable influence.

Furthermore, it has been observed that the organo-phosphorus compounds are capable of improving the load-bearing capacity of lubricants. This is indicated by the fact that when the organo-phosphorus compound is added to a hydrocarbon oil in a small amount, and the blend tested in an Almen testing machine with straight loading applied, the blended oil is capable of sustaining more than twice the load that could be applied when using the unblended oil before seizure of the bearing occurred. It is of interest to note in this connection, that even though the organo-phosphorus compound improves the film strength of the lubricating oil, the blended oil is not corrosive to copper or similar metals present in alloy bearing metals.

In the practice of this invention, oil-soluble compounds which can be most safely and conveniently handled are used. Such compounds, in general, contain larger organic groups, and, consequently, are less sensitive to decomposition by air and are less volatile than lower molecular weight compounds. The selection of a particular compound or combination of compounds for blending with a hydrocarbon oil is based on the particular use of the composition. For example, the less volatile compounds should be employed in compositions to be used at high temperatures.

It is to be understood that the organo-phosphorus compounds featured by this invention may be used to preserve lubricants of all types from deterioration by heat and/or oxidation, although they are used chiefly in motor lubricants comprising petroleum hydrocarbon oils having viscosities ranging upwardly from 150 Saybolt seconds at 100° F., i. e. upwardly in S. A. E. No. beginning with S. A. E. 10 lubricating oil. However the oils to be improved may be much more viscous, as in the case of semi-fluid lubricants and asphalts, or less viscous, as in the case of non-viscous lubricants or fuel oils which have viscosities in the range of 30 to about 150 Saybolt seconds at 100° F. and which are more viscous than kerosene.

Other addition agents may also be incorporated in the oil compositions, as for example, agents which aid in solubilizing and stabilizing these organo-phosphorus compounds, corrosion inhibitors, oiliness agents, and oxidation inhibitors, of other types, dyes, soaps, thickeners, viscosity index improvers, pour point depressants, etc.

The present invention is not limited to any particular addition agent nor to any theory as to the effect of these substances nor to the particular amounts of addition agents to be used.

I claim:

1. A composition of matter comprising a hydrocarbon oil boiling above the kerosene boiling range and containing an oil-soluble, an organo-diphosphine compound in sufficient amount to cause a reduction in the amount of varnish-like deposits formed on hot metal surfaces of internal combustion engines lubricated by said composition.

2. A composition as described in claim 1, in which said organo-diphosphine compound is tetraphenyl diphosphine.

3. A lubricant comprising a viscous hydrocarbon oil stabilized by a small quantity of an organic diphosphine.

4. The method of reducing the amount of hard varnish-like and sludge deposits formed in lubricating hot metal surfaces of internal combustion engines, which comprises applying to said metal surfaces a mineral lubricating oil containing in solution an organic diphosphine.

RAPHAEL ROSEN.